No. 859,333. PATENTED JULY 9, 1907.
W. H. PRATT.
METER.
APPLICATION FILED SEPT. 25, 1905.

3 SHEETS—SHEET 1.

Witnesses:

Inventor,
William H. Pratt,
By Albert G. Davis
Att'y

No. 859,333. PATENTED JULY 9, 1907.
W. H. PRATT.
METER.
APPLICATION FILED SEPT. 25, 1905.
3 SHEETS—SHEET 2.
Fig. 2.
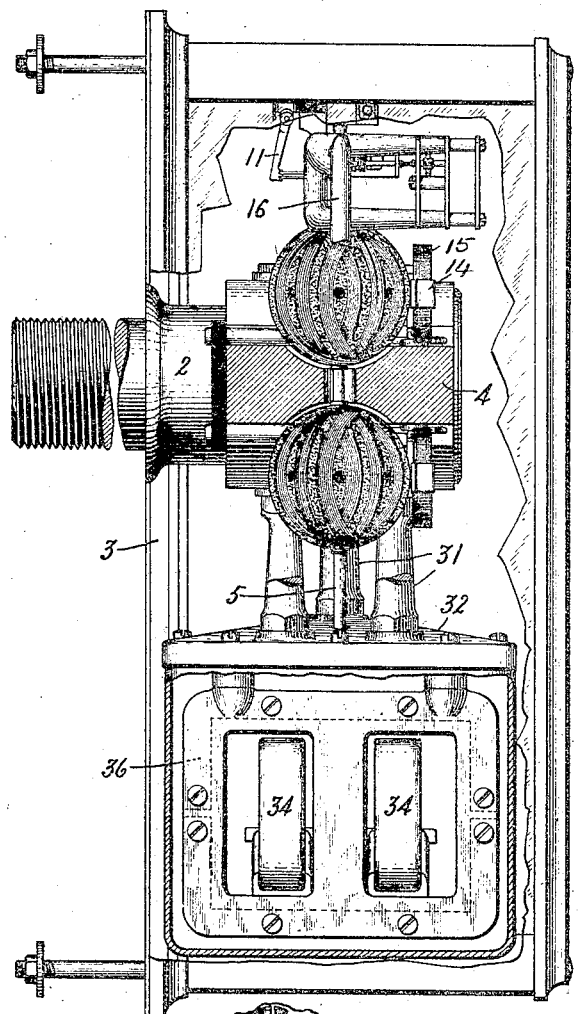
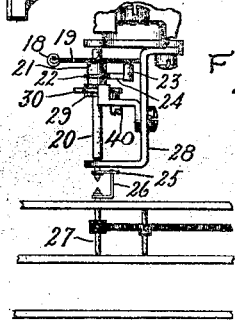
Fig. 3.
Witnesses:
J. Ellis Glen
Helen Oxford
Inventor,
William H. Pratt
By Albert G. Davis
Att'y No. 859,333. PATENTED JULY 9, 1907.
W. H. PRATT.
METER.
APPLICATION FILED SEPT. 25, 1905.

3 SHEETS—SHEET 3.

Witnesses:

Inventor:
William H. Pratt,

UNITED STATES PATENT OFFICE.

WILLIAM H. PRATT, OF LYNN, MASSACHUSETTS, ASSIGNOR TO GENERAL ELECTRIC COMPANY, A CORPORATION OF NEW YORK.

METER.

No. 859,333.

Specification of Letters Patent.

Patented July 9, 1907.

Application filed September 25, 1905. Serial No. 279,889.

*To all whom it may concern:*

Be it known that I, WILLIAM H. PRATT, a citizen of the United States, residing at Lynn, in the county of Essex, State of Massachusetts, have invented certain new and useful Improvements in Meters, of which the following is a specification.

This invention relates to integrating electric meters of the motor type and more particularly to meters for measuring energy supplied to and delivered by storage batteries.

The objects of the invention are to provide a strongly constructed instrument which will accurately indicate the energy consumed in charging a secondary battery and the energy supplied by the battery and which is astatic, that is, so arranged that it will be uninfluenced by magnetic fields external to the meter, as, for instance, the fields of permanent magnets and conductors traversed by currents in proximity to the meter.

The novel features of my invention will be definitely indicated in the claims appended hereto.

Figure 1:
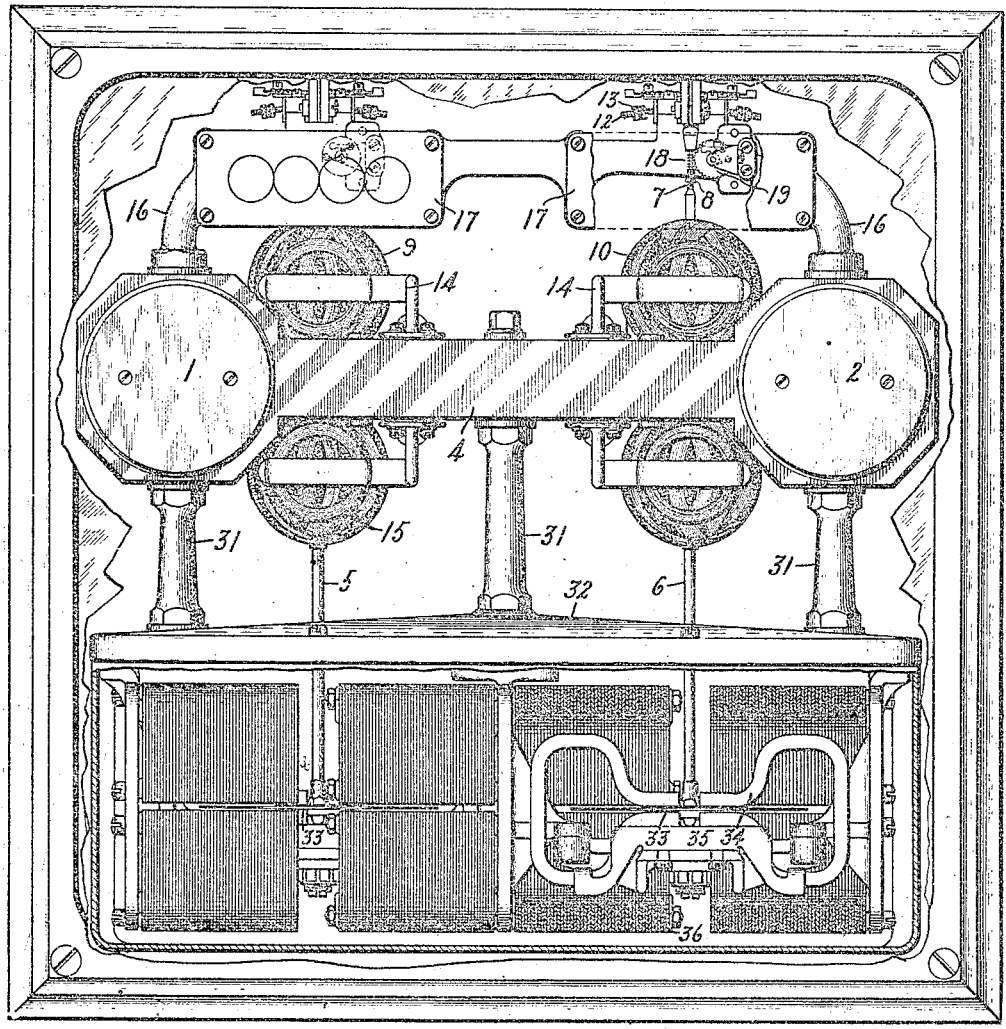
Figure 4:
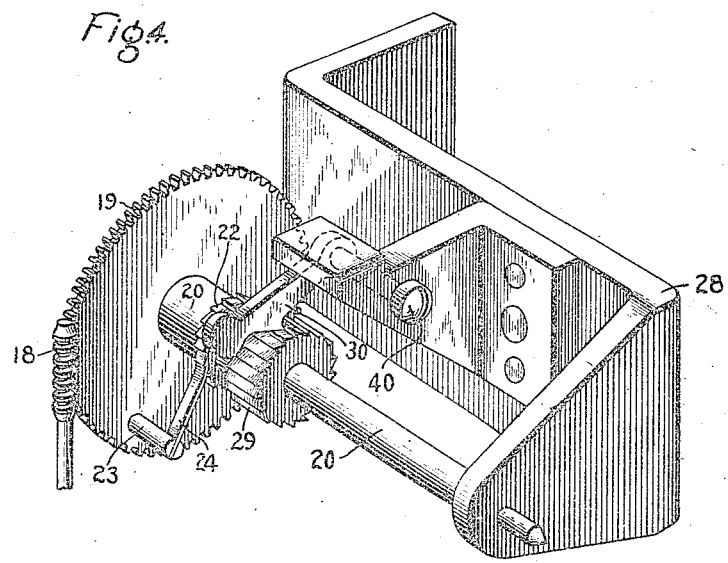
Figure 5:
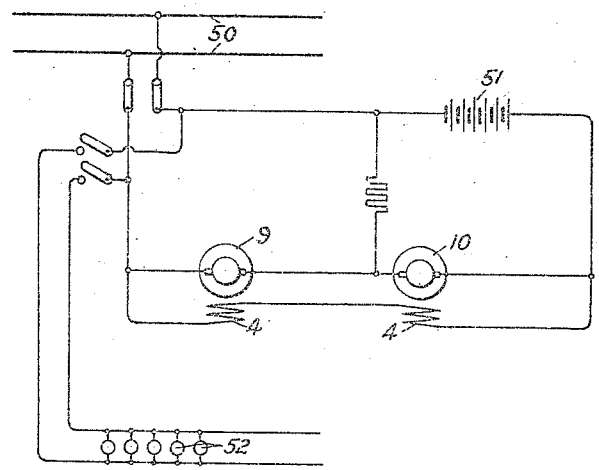

The details of construction and the mode of operation of my improved storage battery meter will be better understood by reference to the following description taken in connection with the accompanying drawings which show the preferred embodiment of the invention and in which Figure 1 is a front view of the meter broken away in part; Fig. 2 is a side view broken away in part; Fig. 3 is a detail view of the gearing by which each of the movable elements is connected to its recording train; Fig. 4 shows an enlarged view in perspective of a portion of the same; and Fig. 5 is a diagram of the circuit connections.

Referring to the drawings, 1 and 2 indicate terminals which extend through the back 3 of the casing. These terminals are connected by a conductor 4 which carries the current to be measured, or a definite portion thereof.

The meter illustrated in the drawings is designed for measuring currents of high amperage and the conductor 4 is therefore a heavy bar of conducting material having enlarged ends which fit tightly over the ends of the terminals 1 and 2 and make good electrical contact therewith.

I do not wish to be understood as limited to this type of field conductor however as a field coil of one or more turns may be used instead if desired.

Extending through openings in the conductor 4, as shown in Fig. 2, are two vertical shafts 5 and 6, independently rotatable in suitable bearings. Each of these shafts carries an armature mounted for rotation in proximity to the conductor in the magnetic field which is established when current flows through the conductor.

In order to make the meter astatic, that is independent of magnetic fields other than the field of the conductor
4, I make each of the two armatures 9 and 10 carried by the shafts 5 and 6, respectively, in two parts and mount one part above and the other below the conductor 4. A single commutator 7 is mounted on each shaft and the coils of the two-part armature are connected to the segments thereof. Brushes 8 bear on each commutator 7 to conduct the current to and from the armatures and connect armature 9 across the lines carrying the charging current and the armature 10 across the secondary battery. The brushes 8 are carried by pivotally mounted brush-holders 11 each provided with an arm 12 extending laterally from its pivot and having weights 13 threaded thereon which hold the brushes against the commutator with a constant pressure and which can be adjusted to vary this pressure.

Each of the two parts of the armatures 9 and 10 consists preferably of a plurality of circular armature coils wound on a hollow supporting member to form a sphere. The conductor 4 is hollowed out on its upper and lower sides about the openings for the shafts 5 and 6 and the parts of the two armatures are mounted upon the shafts so that they extend into these hollowed out portions, as this disposition of the parts makes the lines of force of the conductor 4 more effective in developing torques. Instead of a single armature divided into two parts and arranged as described, two separate armatures on each shaft having individual commutators may be employed though the former construction is preferred. In either case the two armatures or armature parts are so arranged that they both tend to rotate the shaft on which they are mounted in the same direction.

Adjustably mounted upon the conductor 4 are supports 14 carrying coils 15 which are held in inductive relation to the armature elements and connected in series therewith to compensate for friction in the bearings of the shafts and in the dial trains. Extending upward from the conductor 4 is a supporting frame 16 carrying two dial trains 17, 17, each of which is adapted to be driven by one of the shafts 5, 6. For this purpose each shaft carries a worm 18 which meshes with a worm-wheel 19 loose on a shaft 20 mounted in bearings formed in the frame 16 and an arm 28 secured thereto. On shaft 20 is a ratchet wheel 22 and on worm-wheel 19 is a stud 23 carrying a leaf-spring actuating pawl 24 which engages the teeth of the ratchet wheel 22. A second ratchet wheel 29 is mounted on shaft 20 the teeth of which extend in the same direction as those of ratchet 22. A retaining pawl 30 is pivoted to a support 40 secured to arm 28 with its tooth bearing by gravity on the periphery of ratchet 29.

On the end of the shaft 20 is a crank 25 adapted to engage an arm 26 carried by the first shaft 27 of the dial train. It will be seen that with this arrangement of the parts, when one of the shafts and the worm-wheel 19 driven thereby rotates in one direction, the actuating pawl 24 carried by the worm wheel will engage the ratchet wheel 22 and cause the shaft 20 to rotate with the worm wheel 19 and thereby drive the recording train by means of the crank 25 and arm 26. In this case the pivoted pawl 30 will slide loosely over the teeth of the ratchet wheel 29. But when the shaft 26 and its worm-wheel rotate in the opposite direction the retaining pawl 30 by engaging a tooth of wheel 29 will prevent shaft 20 from rotating and the spring pawl 24 will move loosely over the teeth of ratchet 22.

Supported on posts 31 depending from the conductor 4 is a plate 32 of iron or other material of good permeability through openings in which the shafts 5 and 6 extend. Below this plate each of the shafts carries a disk 33 of copper or aluminium which rotates in the fields of permanent magnets 34 held in suitable clamps 35. Each clamp 35 holds two magnets 34 and the unlike poles of these two magnets are on the same side of the disk 33 so that the magnets are astatically arranged.

Mounted above and below each of the damping disks 33 and on each side of the shafts 5 and 6 are shields 36 each shaped like half a rectangle, as shown in dotted lines in Fig. 2, and each consisting of a bundle of laminations of sheet metal of good permeability, preferably soft iron. The shields above and below the magnets are separated by a short space in the plane of the disk 33 so that the moving element can be withdrawn without removing the shields. The plate 32 and the laminated shields 36 carry the lines of force of stray fields and in that way protect the permanent magnets 34 so that the damping effect of the magnets and the disks 33 is unaffected by stray lines of force. Considerable advantage is obtained by making these shields 36 of sheet metal laminations as such shields are less apt to become polarized, better material may be obtained and as laminated shields are more convenient and economical to manufacture.

The meter is connected in circuit as shown diagrammatically in Fig. 5, by connecting the conductor 4 in one of the lines in such a manner that it will be traversed in one direction by current flowing from the charging mains 50 to the storage battery 51 and in the opposite direction by current flowing from the battery to the translating devices 52 supplied thereby. In the figure the conductor 4 is shown conventionally in the manner employed to illustrate a field winding to indicate the fact that the current in this conductor furnishes the field for the two meter elements. The armatures 9 and 10 are connected across the charging mains and across the battery, respectively. When energy is supplied to the battery through conductor 4, both the shafts 5 and 6 and the armatures carried thereby rotate but on account of the gearing between the shafts and their respective dial trains 17 and the arrangement of the ratchet and pawl mechanisms as above described only one of the shafts, the one carrying the armature which is connected across the charging lines, will actuate its recording train as the shaft 20 for driving the other dial train will be locked against rotation by its pawl 30 and ratchet 29. The dial train which is actuated will therefore give a registration of the energy supplied to the storage battery. When the battery is connected to the translating devices, current will flow in the opposite direction in conductor 4 and both armatures and their shafts will rotate in the opposite direction. In this case the dial which registered the charging energy will not be actuated but will be locked against movement by its retaining pawl 30 and the other dial train will be actuated, since its driving shaft 20 will be rotated by pawl 24 engaging a tooth of ratchet 22, the pivoted retaining pawl 30 sliding over the teeth of ratchet 29. This latter dial train driven by the shaft carrying the armature which is connected across the battery will therefore register the energy supplied by the battery. The two dials thus integrate the charging and discharging energy independently.

Furthermore it will be seen that the meter will be uninfluenced by stray magnetic fields as the damping mechanism is thoroughly shielded and as a stray field tending to retard or accelerate the speed of the upper part or element of either armature will have the opposite effect on the lower one since the stray field and the field of the conductor 4 will act cumulatively on one armature element and differentially on the other.

What I claim as new and desire to secure by Letters Patent of the United States, is,—

1. A storage battery meter comprising a single field conductor, two independently rotatable shafts, an armature carried by each shaft in inductive relation to said field conductor, a dial train for each shaft, and means connecting each shaft in driving relation to its dial train during rotation of the shaft in one direction.

2. A storage battery meter comprising a single field conductor, two independently rotatable armatures in inductive relation to said field conductor, a shaft for each armature, two dial trains, and means connecting each shaft in driving relation to one of the dial trains during rotation of the shaft in one direction and permitting the shaft to rotate in the opposite direction without actuating the dial train.

3. A storage battery meter comprising two terminals, a bar of conducting material connecting the terminals, two armatures mounted in proximity to said bar, a shaft for each armature, two dial trains, and means connecting each shaft in driving relation to one of the dial trains during rotation of the shaft in one direction.

4. A storage battery meter comprising a single field conductor, two independently rotatable shafts, an armature on each shaft consisting of two armature parts mounted on the shaft in different parts of the magnetic field established by said field conductor, two dial trains, and means connecting each shaft to one of the dial trains during rotation of the shaft in one direction.

5. A storage battery meter comprising two terminals, a bar of conducting material connecting the terminals, two independently rotatable shafts, two armature elements on each of said shafts one above and one below said bar, two dial trains, and means connecting each shaft to one of the dial trains during rotation of the shaft in one direction.

6. A storage battery meter comprising a single field conductor, two independently rotatable shafts, an armature carried by each shaft in inductive relation to said field conductor, a dial train for each shaft, a ratchet and pawl connection between each shaft and its dial train to cause rotation of the shaft in one direction to actuate its dial train, and a ratchet and pawl to prevent actuation of the dial train when its shaft is rotating in the opposite direction.

7. In a meter, an astatic motor comprising a bar of conducting material carrying the current to be measured having an opening therethrough and depressions in the bar at the ends of the opening, a rotatable shaft extending through the opening, and two spherical armature elements mounted on the shaft one above and the other below the bar and extending into said depressions.

8. In a meter, a motor mechanism, a dial train actuated thereby, a damping device comprising a plate of conducting material carried by the shaft of the motor mechanism and a permanent magnet whose field is cut by said plate, and a shield for said permanent magnet formed of laminations of sheet metal secured together.

9. In a meter, a motor mechanism, a dial train actuated thereby, a damping device comprising a disk of conducting material carried by the shaft of the motor mechanism and permanent magnets whose fields are cut by said disk, and a housing for said magnets formed of laminations of sheet metal of good permeability secured together, said housing having an opening therein in the plane of the disk through which the disk may be withdrawn.

In witness whereof, I have hereunto set my hand this twenty-second day of September 1905.

WILLIAM H. PRATT.

Witnesses:
JOHN A. MCMANUS, Jr.,
HENRY O. WESTENDARP.